United States Patent [19]

Gerome

[11] Patent Number: 5,744,715
[45] Date of Patent: Apr. 28, 1998

[54] TACTILE-ACOUSTIC INFORMATION DETECTING AND MEASURING APPARATUS AND METHOD

[75] Inventor: Jean-Paul Gerome, Montchaboud, France

[73] Assignee: Apollon's Algebra (Gibraltar) Limited, Gibraltar

[21] Appl. No.: 776,657

[22] PCT Filed: Aug. 4, 1995

[86] PCT No.: PCT/IB95/00615

§ 371 Date: Jan. 31, 1997

§ 102(e) Date: Jan. 31, 1997

[87] PCT Pub. No.: WO96/04574

PCT Pub. Date: Feb. 15, 1996

[30] Foreign Application Priority Data

Aug. 5, 1994 [WO] WIPO ............ PCT/IB94/00237

[51] Int. Cl.$^6$ .................... G01V 1/00; G01V 9/00
[52] U.S. Cl. .................. 73/432.1; 73/570; 73/DIG. 1;
 250/372; 324/300; 324/71.1; 340/870.28;
 47/1.3; 47/DIG. 9
[58] Field of Search .............. 73/19.03, 24.01–24.06,
 73/29.01, 54.41, 61.79, 64.53, 587, 602,
 617, 645–649, 659, 661, 73–77, DIG. 1,
 432.1; 250/372; 47/1.3, DIG. 9; 71/1; 324/71.1,
 300; 340/870.28

[56] References Cited

U.S. PATENT DOCUMENTS

| | | | |
|---|---|---|---|
| 2,482,773 | 9/1949 | Hieronymus | 250/372 |
| 4,813,419 | 3/1989 | McConnell | 128/421 |
| 5,285,059 | 2/1994 | Nakata et al. | 250/205 |
| 5,451,924 | 9/1995 | Massimino et al. | 340/407.1 |

*Primary Examiner*—Hezron E. Williams
*Assistant Examiner*—Rose M. Miller
*Attorney, Agent, or Firm*—Clifford W. Browning; Woodard, Emhardt, Naughton, Moriarty & McNett

[57] ABSTRACT

A tactile-acoustic transducer comprises a vibrator plate, microphone means and first and second electrode members which are connected to a source of information through a tuneable network. The microphone means are coupled to a computer having display devices and a control output delivering control signals to the tuneable network. Rubbing the vibrator plate with the fingertip of his middle finger allows an operator to assess two different states of the transducer, perceived as "stick" and "non-stick" rubbing conditions, the "stick" condition being accompanied by emission of a characteristic sound and occurring when the network is tuned exactly in accordance with the phenomenon or condition of the source to be detected or measured.

17 Claims, 3 Drawing Sheets

TACTILE-ACOUSTIC INFORMATION DETECTING AND MEASURING APPARATUS AND METHOD

The present invention relates to the art of detecting and measuring phenomena or conditions present at a source of information, in order to allow acquisition and selection of such information and presentation thereof to the consciousness of an observer. More particularly, the invention relates to an apparatus and a method for detecting and/or measuring a parameter of a phenomenon or condition, using a cutaneous sensory receptor, such as the Pacinian corpuscle, by means of a tactile detector of a new kind.

BACKGROUND OF THE INVENTION

U.S. Pat. No. 2,482,773, to Thomas G. Hieronymus, describes an apparatus for the detection of emanations from materials, for example for analyzing radiations from a substance by means of a radiation pick-up unit coupled through a manually operated analyzer tuneable to a specific desired radiation and through intermediate circuits to a tactile detector. This detector of the prior art comprises an electrical conductor coated with material, for example a plastic material, capable of giving evidence of the presence of energy flowing through the conductor by producing a greater drag or resistance to the movements of the hand or fingers of an operator thereover. The possibilities of application of such a detector, its sensitivity, reproduceability and precision of detection appear, however, to be rather limited.

SUMMARY OF THE INVENTION

The present invention aims in particular at providing an information detecting and measuring apparatus comprising a substantially improved detector in the form of a tactile-acoustic transducer having high sensitivity and a high degree of precision, as well as being applicable to a wide field and range of measurements in connection with the method according to the invention.

The apparatus for detecting and measuring phenomena or conditions represented by information appearing on an electrical conductor coupled to a source of such phenomena or conditions, is characterized according to the invention in that it comprises a vibrator plate of solid material mounted on a frame so as to form a membrane capable of generating acoustic signals when being rubbed on its surface by an operating persons fingertip, microphone means arranged opposite said vibrator plate for receiving said acoustic signals and at least first and second substantially flat electrode members arranged between said vibrator plate and said microphone means in substantially parallel relationship with each other and with said vibrator plate, said electrode members being electrically connected to the output of a tuneable network comprising control elements for the tuning thereof, the input of said tuneable network being coupled to said source of information and the output of said microphone means being connected over an analog-to-digital converter circuit to an input of a computer adapted for processing the information contained in said acoustic signals and for producing a detection or measuring signal derived therefrom.

The vibrator plate of this apparatus is preferably made of wood, in particular of hard wood such as rose wood, purple wood or nazareno wood. Advantageously, electric heating means are provided for warming said vibrator plate.

According to a preferred embodiment of the apparatus, said first electrode member is mounted between said vibrator plate and said second electrode member on an electrically insulating, substantially ring-shaped supporting member and has a central opening in it, said second electrode member being suspended with respect to said first electrode member at an adjustable distance therefrom.

Preferably, the first electrode member is made of galvanized iron, while the second electrode member is made of aluminum.

The present apparatus can comprise indicator means connected to the output of the computer for visually displaying and/or acoustically reproducing the detection or measuring signal. The plurality of control elements of the tuneable network are preferably also being adjusted through the computer under the control of the operating person.

In a particular embodiment, the tuneable network comprises at least one series of variable resistor means, capacitor means and/or inductance means connected between the electrical conductor coupled to the source of information, and at least one of the first and second flat electrode members.

The variable resistor, capacitor and inductance means can, respectively, comprise a plurality of resistive, capacitive and/or inductive elements connected to an electronic switch bank for selectively inserting these elements in the tuneable network, the switch bank being connected directly, or through interface means, to a control output of said computer delivering control signals for the operation of switches of the switch bank.

The source of information comprises sensing means capable of sensing a phenomenon or condition to be detected or measured. These sensing means can comprise electrode means coupled with a sample or specimen exhibiting said phenomenon or condition and/or antenna means. Furthermore, the tuneable network has preferably at least one additional input terminal for connection to said network of at least one outside generator of signals capable of modifying signals derived from the source of information and/or modifying and/or changing the state of said source.

The method of operating the apparatus according to the invention is based on the use of the distal phalangia of the middle finger of the operating person for rubbing the vibrator plate. The tip of the middle finger comprises the Pacinian corpuscle which is a mechano-receptor located in the hypoderm, and which is capable of transmitting sensed data to the brain through a carrier wave of between 1 Hz and about 1.5 kHz. The insertion of this particular mechano-receptor in the detection and measuring loop, which actually results in harnessing the Pacinian corpuscle to the apparatus, appears to be of decisive importance for the applicability of the present method as a means for scientific investigation, for acquisition of information and for retrieval thereof.

The invention generally provides a method of detecting and/or measuring a parameter of a phenomenon or condition represented by information appearing on at least one electrical conductor coupled to a source of such information, which method comprises rubbing a detector surface of a tactile-acoustic transducer with a member having cutaneous sensory receptors or with an artificial member capable of simulating such receptors, said transducer being coupled through a tuneable network with said source of information, and further comprises tuning said tuneable network and assessing a significant change of state in the condition of said rubbing which occurs at a certain setting of said tuneable network, representative of the parameter to be detected or measured. More particularly, by that method, information related to various parameters of said phenomenon or condition, as represented by corresponding settings of said tuneable network, is stored in a computer in an encoding operation, said stored information being used in a subsequent detecting and/or measuring operation to establish correspondence between said parameter to be detected or measured and said certain setting of said tuneable circuit.

BRIEF DESCRIPTION OF THE DRAWING FIGURES

Further aspects, objects and advantages of the invention will become apparent from the following description of a specific embodiment given by way of example with reference to the accompanying drawings, in which.

DETAILED DESCRIPTION OF THE PREFERRED EMBODIMENT

Figure 1:
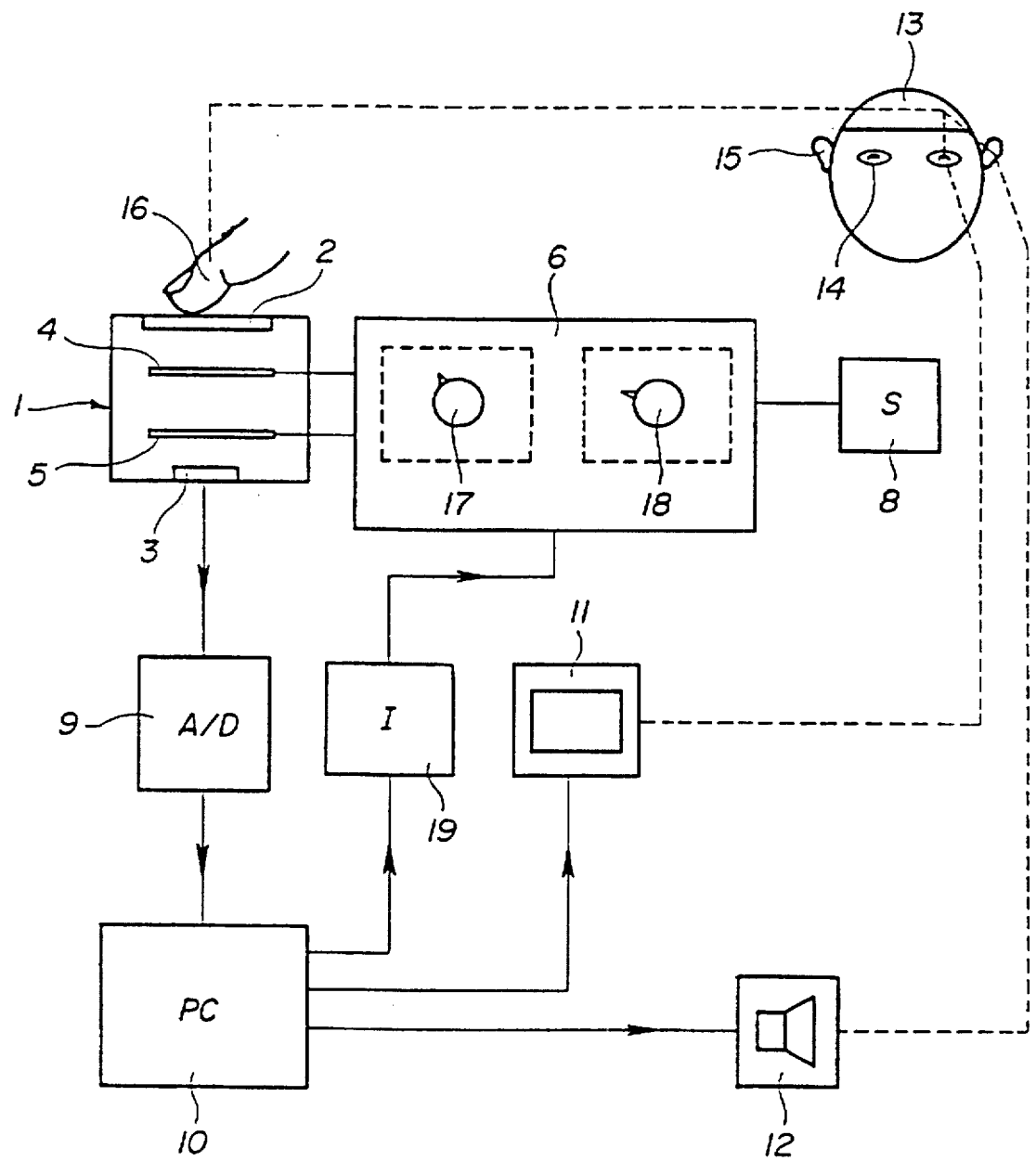
FIG. 1 is a block diagram showing the general arrangement of an apparatus according to the invention.

The bloc diagram of FIG. 1 shows schematically a tactile-acoustic transducer 1 with its main parts, namely a vibrator plate 2, a microphone 3 and two electrodes 4 and 5. These electrodes are connected to the output of a tuning network, the input of which is coupled to a source of information 8 labelled S. The output of the microphone 3 is connected to an analog-to-digital converter 9, which in turn is connected to an input, such as an input for digital audio signals, of a computer 10, for example a personal computer PC. The computer 10 has preferably outputs connected to indicator means, such as a video monitor 11 and a loud-speaker 12. A further output of the computer is preferably connected through an interface 19, labelled I to the tuning network 6 for computer-controlled tuning as described hereafter.

The diagram of FIG. 1 further indicates schematically the links of an operating person 13 with the apparatus, through its eyes 14, its ears 15 and a tip 16 of its middle finger which receive, respectively, signals from the monitor 11, the loud-speaker 12 and the vibrator plate 2. The operating person's brain converts the corresponding data into information, adding meaning through a cognitive process and feeding the consciousness of the person.

In an operation of detecting certain information from the source 8, the operator gently rubs the surface of the vibrator plate 2 with the tip of his middle finger of one hand, while the other hand manipulates control elements of the tuneable network 6 represented schematically in the drawing by knobs 17 and 18. Actually, the tuneable network 6 is provided with a plurality of control elements or knobs, each coupled to a variable resistor or capacitor, for example. The two separate parts of the tuneable network 6 are shown to illustrate the fact that a complete tuning operation is generally effected in at least two steps, namely a first operation of adjustment to a given type of information from the source 8 on the basis of previously determined settings, and a second operation of tuning to detect and to determine specific information within the type of information selected by the first adjustment.

The structure of the tuneable network can be similar, in particular, to that shown in the above mentioned U.S. Pat. No. 2,482,773, the disclosure of which is considered as being incorporated in the present description. However, preferably, a tunable network 6 as shown schematically in FIG. 2 is used in the present apparatus and will be described in more detail hereafter.

When rubbing the vibrator plate with his finger, the operator generates an acoustic signal which is received by the microphone 3 and fed to the computer 10 after analog to digital conversion.

It appears that for a certain setting of the tuneable network, the acoustic signal delivered by the microphone 3 presents a characteristic, well-determined structure or spectrum which can be recognized by the computer and can be recognized by a skilled operator as a particular sound. This sound signal is only generated in the corresponding tuning condition and fades away beyond that tuned state, similarly to a resonance phenomenon. The corresponding setting of the tuneable network as determined by the various control elements, is representative of the information provided from the source 8. Actually, the state of the tactile-acoustic transducer in which the mentioned characteristic sound is audible, is also characterized by a tactile perception of a roughness or "stickiness" which can be assessed by the operating person. When the setting of the tunable network is changed from the mentioned tuned state, the sensation of the operator changes to one of "smoothness" while there is no conscious change in the fingertip pressure or rate of movement of the fingertip. The difference between the two states of the transducer corresponding to the mentioned "stick" and "non-stick" state and its reference to the setting of the tunable network is a basic element of the present invention. It presently appears that not only the Pacinian corpuscle, but also other cutaneous sensors may be active in the two states and contribute to the perception of the operating person. Actually, fingertip skin in human subjects contains at least four anatomically and physiologically distinct sets of mechano-receptors with myelinated fast conducting axons. Besides the mentioned Pacinian corpuscles having recognized high sensitivity in a frequency range of about 200 to 300 Hz, there are Meissner corpuscles which are also rapidly adapting receptors, but in a lower range of frequencies, then Merkel cell receptors with maximum sensitivity in the range of 0 to 100 Hz and further slowly adapting Ruffini corpuscles, also with a maximum sensitivity in the low frequency range. It is likely that these receptors are passive recipients of the mechanical states caused by the fingertip passing across the plate of the transducer. The loss of vibration in the "non-stick" state may be associated with a change in the fingertip tissue that reduces its ability to vibrate. However, the precise mechanisms and their effectiveness in relation with the present apparatus are not yet fully clarified. In particular, the capacity of the mechano-receptors involved, in detecting not only signals in the low frequency range, but also signals of substantially higher frequencies or signal components of such high frequencies carried by the low frequency signals, may reveal to be essential in the operation and the applicability of the present apparatus. It is also to be mentioned that in place of a fingertip or other member having cutaneous sensory receptors, an artificial member can be used in which such receptors are simulated.

Figure 2:
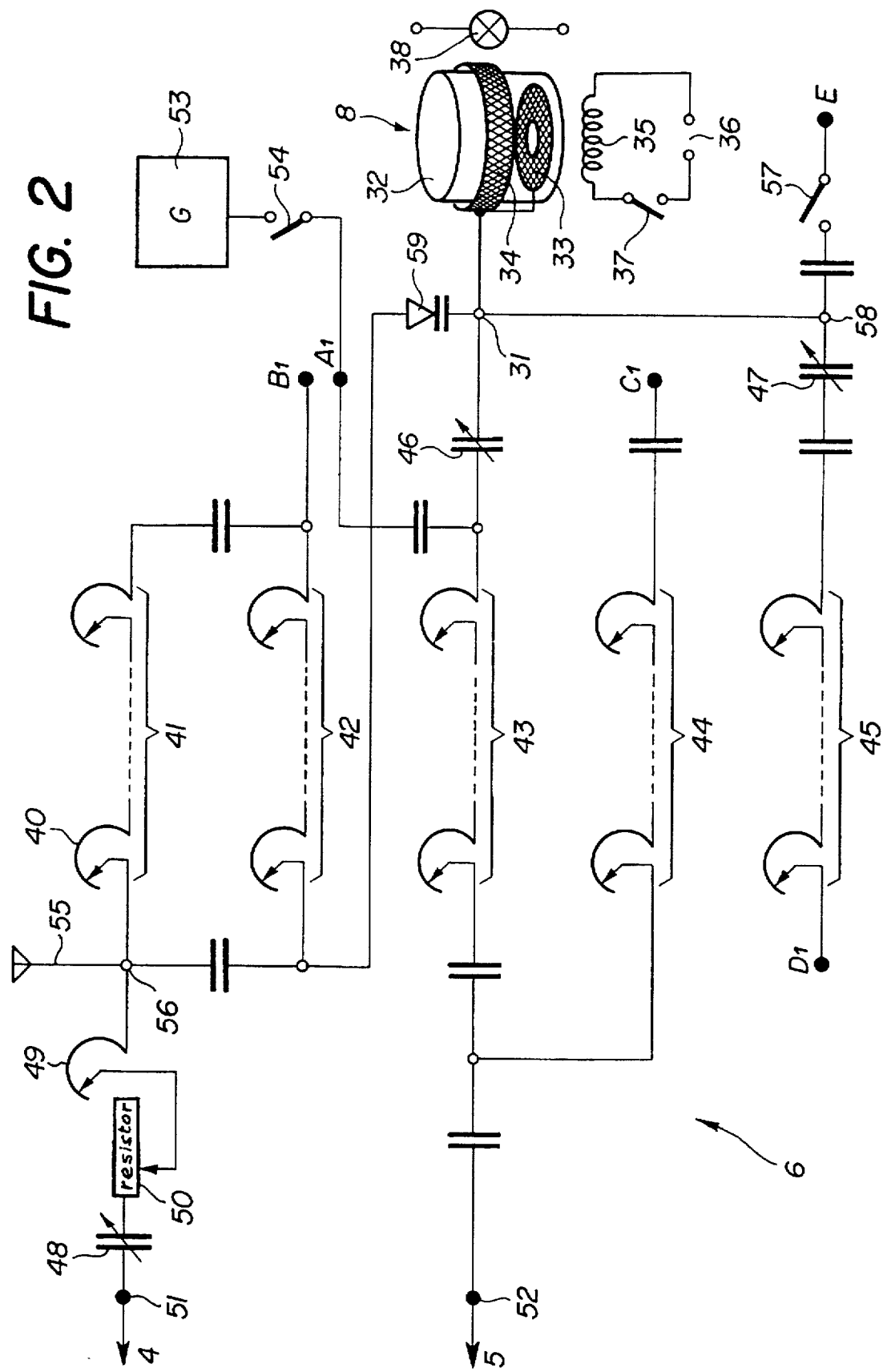
FIG. 2 is a schematic electric diagram of a tuneable network as used in the apparatus of FIG. 1.

Referring to FIG. 2, the tuneable circuit shown has an input terminal 31 connected to a source 8 represented by way of example as a cylindrical glass vial 32 provided with an inner ring-shaped flat electrode 33 and an outer sleeve-like band electrode 34, both of which are connected to terminal 31. The source 8 further comprises a coil 35 which can be connected to a generator of alternating current at terminals 36 via a switch 37. The coil 35 is used to bring the source in a magnetically neutral state before a new measurement, switch 37 being preferably operated through the computer 10. FIG. 2 further shows a light source 38 which is fed by a d.c. supply not shown and chosen to emit white light in the direction of the glass vial containing a sample of material to be measured.

The tuneable network of FIG. 2 comprises five series of variable reactors such as 40, represented as rotary switches and having, for example, eight positions. Several, for example nine, of such rotary switches are connected in series to form a switch bank and in the present case, five switch banks designated 41 to 45 are used in the tuneable network. In a preferred embodiment, an assembly of electronic switches rather than rotary switches is used (with an overall inductance of about 1 Henry and an overall resistance of about 300 Ohms per switch), such electronic switches allowing control and setting thereof through the computer 10. The circuit of FIG. 2 further shows variable capacitors 46, 47 and 48 which are also preferably electronically controlled and have a value of about 1 to 5 pF. The other capacitors are for coupling purposes. The circuit of FIG. 2 further comprises a varicap or capacitor diode 59 shown connected to terminal 31 as an additional tuning element, as well as a rotary switch 49 similar to 40 and an adjusting resistor 50 connected in series with capacitor 48 to an output terminal 51 which is in turn connected to the electrode member 4 of the transducer. A second output terminal 52 is connected to electrode member 5 of the transducer.

The tuneable network of FIG. 2 is provided with several input terminals at different points of the network for providing external signals from generators such as generator 53, designated G, which can be connected through a switch 54 to an input terminal A1. The switch 54 is preferably controlled by the computer 10. Other terminals for connection of outside signal sources are shown at B1, C1, D1. An antenna 55 is shown connected at point 56 of the network. A further computer-controlled switch 57 is shown to connect point 58 of the circuit to ground at terminal E which may be desired if no other ground connection is available.

The tuning network of FIG. 2 allows extremely precise tuning by either directly setting the variable elements through control knobs such as 17, 18, or preferably by using electronic switches through the computer via the keyboard or similar external actuating devices or appropriate programmartion.

Figure 3:
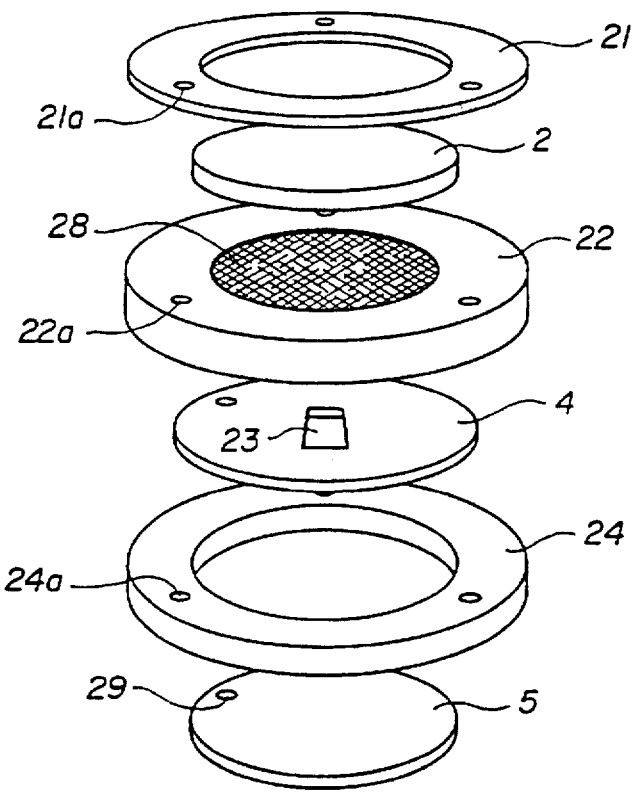
FIG. 3 is a schematic perspective exploded view showing the main components of a tactile-acoustic transducer as used in the apparatus of FIG. 1.
Figure 4:
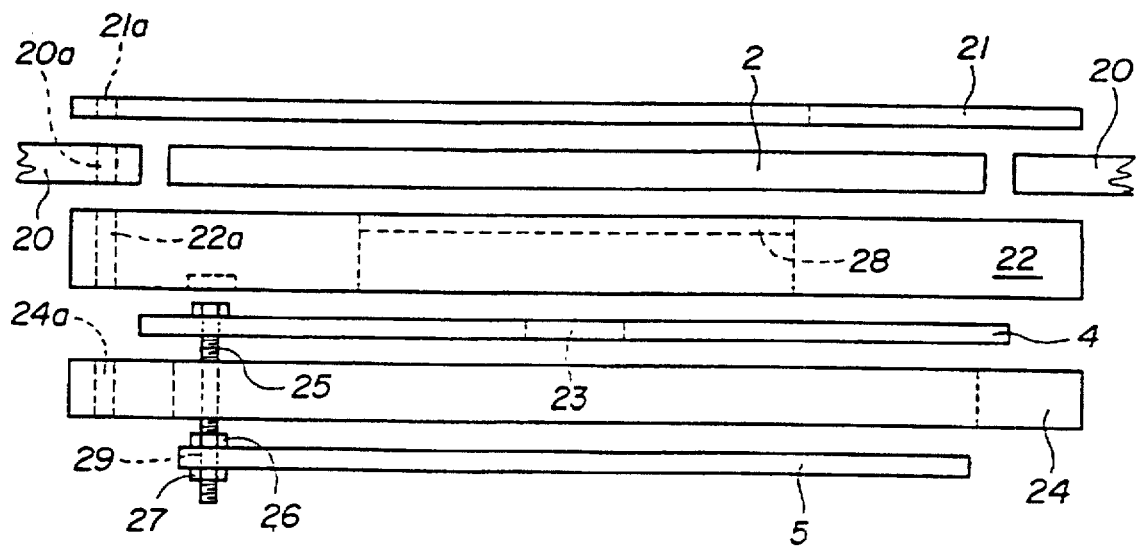
FIG. 4 is a schematic side view of the main components of the transducer of FIG. 3 in a partly disassembled state.

FIGS. 3 and 4 show the arrangement of certain parts of the tactile-acoustic transducer 1 used in the apparatus of FIG. 1. Actually, the figures represent an exploded or disassembled view of the sound-generating portion of the transducer.

The vibrator plate 2 having, for example, a diameter between 4 to 15 cm, preferably of 10 to 15 cm and a thickness of 2 to 8 mm, is mounted on a frame 20 which is preferably part of the housing of the transducer 1. In the shown embodiment, the vibrator plate 2 is sandwiched between a top plate 21 and a base plate 22 which are both substantially ring-shaped. The vibrator plate 2 is made of a material having preferably isotropically controlled mechanical properties. Fine-grained woods, preferably rose wood or purple wood, cut parallel to the fibers and finely sanded, are particularly suitable. The top plate 21 can be made of sheet metal, for instance aluminum, iron, copper or brass. The base plate 22 is made of an electrically non-conductive material, for instance of regular 4 to 5 mm thick plywood.

Within the central opening of the base plate 22, electrical heating wires schematically indicated at 28 are arranged substantially flush with the upper surface of the base plate, so that the heat developed can be easily transferred to the vibrator plate 2. The shape and arrangement of these wires are such that the central opening is not obturated and the sound waves generated by the vibrator plate can pass through that opening. The heating wires are energized by a variable current source adapted to allow control of the temperature of the vibrator plate between about 20° to 60° C.

A first electrode member 4 is arranged below the plate 22. It is preferably made of thin sheet metal, namely, in this embodiment, of galvanized iron of 1 mm thickness, having a central angularly cut window 23. This window can be of variable size and is preferably adjusted during construction for optimal performance of the transducer. To this effect, it can be progressively enlarged by cutting the area of the opening from about 2 to 6 or 8 $cm^2$ until the best results are obtained.

Below the electrode member 4, an insulating ring plate 24 made, for example, of 4 to 5 mm thick insulating material, such as nylon or teflon, is provided. The components 21, 22 and 24 are assembled and attached to the frame 20 or the housing of the transducer 1, by suitable fixing means, for example by screws or bolts inserted into registering holes, such as 21a, 20n, 22a and 24a. The vibrator plate 2 and electrode member 4 are held, respectively, between parts 21 and 22, and 22 and 24, and the generally rather weak tightening force produced by the assembly is adjustable by the fixing means.

Electrode member 5 is preferably made of aluminum of about 0.5 mm thickness, and is suspended below the plate 24 at an adjustable distance from the electrode member 4, for example by means of an insulating screw bolt fitted to member 4 and bearing a pair of screw nuts 26, 27. Bolt 25 extends through an opening 29 of electrode member 5 and the nuts 26, 27 are placed on either side of said member. The distance between electrode members 4 and 5 is generally adjusted in an operation of calibration of the transducer for optimal performance. Ususally, it varies from about 2 to 5 cm. Furthermore, the precise shape of electrode member 5 is defined during said calibration and can be selected according to particular applications of the transducer.

Various changes can be made to the described arrangement without departing from the spirit of the invention.

The following practical example illustrates the operation of the apparatus of the invention.

EXAMPLE 1

Samples of edible grain flour with various humidity contents ranging from about 1 to 20% as determined by usual analytical means, were used to establish a table of setting values in the following way.

Each one of the samples was placed in a glass vial in a sampling enclosure of the apparatus as represented by the block S of FIG. 1. The type of information having first been selected to be the water content by adjusting the tuneable network to a corresponding state, which was previously determined and represented, for example, by a numerical code corresponding to the presence of water, the operator progressively adjusts the tuneable network while gently rubbing the vibrator plate to produce the sound signal referred to above. The appearance of the characteristic sound spectrum in a certain tuning condition which is progressively approached by the operator and results in a resonance-like effect, identifies the degree of humidity of the given sample. The operation is repeated for the different samples and a corresponding table or graph is established or computed.

The table of setting values thus obtained allows to determine the degree of humidity of an unknown sample which is measured in the same way as the known samples, the setting of the tuneable network representing the measured value and being converted to the actual percentage of humidity by means of that table.

It will be understood that the present invention allows detecting and quantifying information from the most different sources coupled to the apparatus, in particular through direct contact or aerial. It allows an extremely rapid access to information previously encoded by means of an apparatus of the type described and stored in the computer, the time for a user to appropriately set the tuneable network and to retrieve the information by means of the tactile-acoustic transducer being substantially shorter than that required in any usual retrieval system based on keywords. This capacity can be most valuably used in many fields of research, diagnosis, analysis and industrial application, to mention only a few areas where time and cost saving are essential.

What is claimed is:

1. An apparatus for detecting and/or measuring phenomena or conditions represented by information appearing on at least one electrical conductor coupled to a source of said information, comprising a vibrator plate of solid material mounted on a frame so as to form a membrane capable of generating acoustic signals when being rubbed on its surface by an operating person's fingertip, microphone means arranged opposite said vibrator plate for receiving said acoustical signals and at least first and second substantially flat electrode members arranged between said vibrator plate and said microphone means in substantially parallel relationship with each other and with said vibrator plate, said electrode members being electrically connected to the output of a tuneable network comprising a plurality of control elements for tuning, the input of said tuneable network being coupled to said source and the output of said microphone means being connected over an analog-to-digital converter circuit to an input of computer means adapted for processing the information contained in said acoustic signals and for producing a detection or measuring signal derived therefrom.

2. An apparatus according to claim 1, wherein said vibrator plate is made of wood, in particular of rose wood, purple wood or nazareno wood.

3. An apparatus according to claim 1, wherein electric heating means are provided for warming said vibrator plate.

4. An apparatus according to claim 1, wherein said first electrode member is mounted between said vibrator plate and said second electrode member on an electrically insulating, substantially ring-shaped supporting member, said first electrode member having a central opening in it, said second electrode member being suspended with respect to said first electrode member at an adjustable distance therefrom.

5. An apparatus according to claim 1, wherein said first electrode member is made of galvanized iron.

6. An apparatus according to claim 1, wherein said second electrode member is made of aluminum.

7. An apparatus according to claim 1, wherein indicator means are provided for visually displaying or acoustically reproducing or visually displaying and acoustically reproducing said detection or measuring signal.

8. An apparatus according to claim 1, wherein said plurality of control elements are adapted for being set through said computer means under the control of said operating system.

9. An apparatus according to claim 1, wherein said tuneable network comprises at least one series of variable resistor means or variable capacitor means or variable inductance means, or any combination thereof, connected between said electrical conductor coupled to said source and at least one of said first and second flat electrode members.

10. An apparatus according to claim 9, wherein said variable resistor, capacitor and inductance means respectively comprise a plurality of resistive, capacitive or inductive elements, or any combination thereof, connected to at least one electronic switch bank for selectively inserting said elements into said tuneable network, said switch bank being connected directly or through interface means to a control output of said computer means, said control output delivering control signals for the operation of switches of said switch bank.

11. An apparatus according to claim 1, wherein said source comprises sensing means capable of sensing a phenomenon or condition to be detected or measured.

12. An apparatus according to claim 11, wherein said sensing means comprise electrode means coupled with a sample or specimen exhibiting said phenomenon or condition.

13. An apparatus according to claim 11, wherein said sensing means comprise antenna means.

14. An apparatus according to claim 1, wherein said tuneable network has at least one additional input terminal for connection to said network of at least one outside generator of signals capable of modifying signals derived from said source of information or for modifying or changing the state of said source.

15. A method of operating the apparatus of claim 1, according to which the operating person uses the distal phalangia of a middle finger, more particularly the area thereof comprising the Pacinian corpuscle, for rubbing the surface of said vibrator plate, said control elements of the tuneable network are adjusted until a sound having a characteristic spectrum is reached, and the state of said control elements in the tuned condition of the network is read or detected.

16. A method of detecting or measuring a parameter of a phenomenon or condition represented by information appearing on at least one electrical conductor coupled to a source of such information, comprising rubbing a detector surface of a tactile-acoustic transducer with a member having cutaneous sensory receptors or with an artificial member capable of simulating such receptors, said transducer being coupled through tuneable network means with said source of information and further comprising tuning said tuneable network means and assessing a significant change of state in the condition of said rubbing which occurs at a certain setting of said tuneable network means representative of the parameter to be detected or measured.

17. A method according to claim 16, wherein information related to various parameters of said phenomenon or condition as represented by corresponding settings of said tuneable network means, is stored in a computer in an encoding operation, said stored information being used in a subsequent detecting or measuring operation to establish correspondence between said parameter to be detected or measured and said certain setting of said tuneable network means.

* * * * *